US008856007B1

(12) United States Patent
Stuttle et al.

(10) Patent No.: US 8,856,007 B1
(45) Date of Patent: Oct. 7, 2014

(54) USE TEXT TO SPEECH TECHNIQUES TO IMPROVE UNDERSTANDING WHEN ANNOUNCING SEARCH RESULTS

(71) Applicant: Google Inc., Mountain View, CA (US)

(72) Inventors: Matthew Nicholas Stuttle, Hayward's Heath (GB); Robert William Hamilton, San Francisco, CA (US)

(73) Assignee: Google Inc., Mountain View, CA (US)

( * ) Notice: Subject to any disclaimer, the term of this patent is extended or adjusted under 35 U.S.C. 154(b) by 14 days.

(21) Appl. No.: 13/652,460

(22) Filed: Oct. 15, 2012

Related U.S. Application Data

(60) Provisional application No. 61/711,680, filed on Oct. 9, 2012.

(51) Int. Cl.
*G10L 13/00* (2006.01)

(52) U.S. Cl.
USPC .......................................... 704/260; 704/258

(58) Field of Classification Search
USPC ............................. 704/9, 260, 275
See application file for complete search history.

(56) References Cited

U.S. PATENT DOCUMENTS

| 4,866,778 | A | * | 9/1989 | Baker | 704/254 |
|---|---|---|---|---|---|
| 5,465,240 | A | * | 11/1995 | Mankovitz | 369/1 |
| 5,842,167 | A | * | 11/1998 | Miyatake et al. | 704/260 |
| 5,850,629 | A | * | 12/1998 | Holm et al. | 704/260 |
| 5,860,064 | A | * | 1/1999 | Henton | 704/260 |
| 6,226,614 | B1 | * | 5/2001 | Mizuno et al. | 704/260 |
| 6,446,040 | B1 | | 9/2002 | Socher et al. | |
| 6,742,021 | B1 | * | 5/2004 | Halverson et al. | 709/218 |
| 6,751,592 | B1 | * | 6/2004 | Shiga | 704/258 |
| 7,283,973 | B1 | | 10/2007 | Loghmani et al. | |
| 7,693,717 | B2 | * | 4/2010 | Kahn et al. | 704/260 |
| 8,433,576 | B2 | * | 4/2013 | Li et al. | 704/270 |
| 2002/0072908 | A1 | * | 6/2002 | Case et al. | 704/260 |
| 2003/0229494 | A1 | * | 12/2003 | Rutten et al. | 704/254 |
| 2004/0067472 | A1 | * | 4/2004 | Polanyi et al. | 434/178 |

(Continued)

FOREIGN PATENT DOCUMENTS

EP          0598598 B1    2/2000

OTHER PUBLICATIONS

A. Chattopadhyay et al., "Hearing Voices: The Impact of Announcer Speech Characteristics on Consumer Response to Broadcast Advertising", Journal of Consumer Psychology, Jan. 2003, pp. 198-204, vol. 13, Issue 3.

(Continued)

*Primary Examiner* — Michael N Opsasnick
*Assistant Examiner* — Olujimi Adesanya
(74) *Attorney, Agent, or Firm* — McDonnell Boehnen Hulbert & Berghoff LLP

(57) ABSTRACT

Disclosed are apparatus and methods for generating synthesized utterances related to output of commands. A command is received at a computing device. A textual output for the command is determined using the computing device. A spoken output of the computing device is generated that utilizes a plurality of vocal characteristic sets. At least a portion of the spoken output corresponds to the textual output. At least a first part of the spoken output utilizes vocal characteristics of a first vocal characteristic set. At least a second part of the spoken output utilizes vocal characteristics of a second vocal characteristic set, where at least some of the vocal characteristics of the first vocal characteristic set differ from the vocal characteristics of the second vocal characteristic set.

20 Claims, 7 Drawing Sheets

(56) References Cited

U.S. PATENT DOCUMENTS

| | | | |
|---|---|---|---|
| 2006/0224386 A1* | 10/2006 | Ikegami | 704/260 |
| 2007/0100628 A1* | 5/2007 | Bodin et al. | 704/261 |
| 2008/0167874 A1* | 7/2008 | Eide et al. | 704/257 |
| 2008/0167875 A1* | 7/2008 | Bakis et al. | 704/258 |
| 2008/0189099 A1 | 8/2008 | Freidman et al. | |
| 2009/0048843 A1 | 2/2009 | Nitisaroj et al. | |
| 2009/0099846 A1 | 4/2009 | Pickering | |
| 2009/0144060 A1 | 6/2009 | Groeger et al. | |
| 2009/0157385 A1* | 6/2009 | Tian | 704/9 |
| 2010/0066742 A1* | 3/2010 | Qian et al. | 345/440.1 |
| 2010/0312547 A1* | 12/2010 | Van Os et al. | 704/9 |
| 2011/0202346 A1* | 8/2011 | Meyer et al. | 704/260 |
| 2012/0016678 A1* | 1/2012 | Gruber et al. | 704/275 |
| 2012/0022872 A1* | 1/2012 | Gruber et al. | 704/270.1 |

OTHER PUBLICATIONS

J. Montrey, "An Investigation of the Effects of Speakers' Vocal Characteristics on Ratings of Confidence and Persuasion", Jan. 9, 2006, Master's Thesis, Dept. of Communication, College of Arts & Sciences, University of Central Florida, Orlando, FL.

D. Swanbrow, "Persuasive Speech: The way we, um, talk sways our listeners", May 11, 2011, University of Michigan News Service, Ann Arbor, MI.

* cited by examiner

USE TEXT TO SPEECH TECHNIQUES TO IMPROVE UNDERSTANDING WHEN ANNOUNCING SEARCH RESULTS

CROSS-REFERENCE TO RELATED APPLICATIONS

This application claims priority to U.S. Patent Application No. 61/711,680, filed Oct. 9, 2012, entitled "Use Text to Speech Techniques to Improve Understanding when Announcing Search Results", which is fully incorporated by reference herein for all purposes.

BACKGROUND

Unless otherwise indicated herein, the materials described in this section are not prior art to the claims in this application and are not admitted to be prior art by inclusion in this section.

Recently, interest has been shown in use of voice interfaces for computing devices. In particular, voice interfaces are becoming more common for devices often used in "eyes-busy" and/or "hands-busy" environments, such as smart phones or devices associated with vehicles. In many scenarios, devices in eyes-busy and/or hands-busy environments are asked to perform repetitive tasks, such as, but not limited to, searching the Internet, looking up addresses, and purchasing goods or services.

FIG. 1 shows scenario 100 of prior-art interaction. During scenario 100, speaker 104 provides spoken command 110 to "Search for restaurants near Union Station" to mobile device 102. Mobile device 102 interprets spoken command 110 as a search query and utilizes a search engine with keywords 114 "Restaurants near Union Station." FIG. 1 shows that, in response to the search query, the search engine returns textual results 116 for three restaurants: (1) Super-Duper Wurst, (2) Pizza 1357, and (3) Yogurt and Salad. Voice outputs for these voice interfaces typically generate flat or (nearly) monotone speech output. As shown in FIG. 1, mobile device 102 generates speech 118 by reading textual results 116 using monotone speech.

SUMMARY

In one aspect, a method is provided. A command is received at a computing device. A textual output for the command is determined using the computing device. A spoken output of the computing device is generated that utilizes a plurality of vocal characteristic sets. At least a portion of the spoken output corresponds to the textual output. At least a first part of the spoken output utilizes vocal characteristics of a first vocal characteristic set. At least a second part of the spoken output utilizes vocal characteristics of a second vocal characteristic set, where at least some of the vocal characteristics of the first vocal characteristic set differ from the vocal characteristics of the second vocal characteristic set.

In another aspect, a computing device is provided. The computing device includes a sound output device, a processor, and a computer-readable storage medium having stored thereon program instructions that, upon execution by the processor, cause the computing device to perform operations. The operations include: (a) receiving a command, (b) determining a textual output for the command, and (c) generating a spoken output that utilizes a plurality of vocal characteristic sets, where at least a portion of the spoken output corresponds to the textual output, where at least part of the spoken output utilizes vocal characteristics of a first vocal characteristic set, where at least part of the spoken output utilizes vocal characteristics of a second vocal characteristic set, and where at least some of the vocal characteristics of the first vocal characteristic set differ from the vocal characteristics of the second vocal characteristic set.

In another aspect, an article of manufacture is provided. The article of manufacture includes a computer-readable storage medium having stored thereon program instructions that, upon execution by a computing device, cause the computing device to perform operations. The operations include: (a) receiving a command, (b) determining a textual output for the command, and (c) generating a spoken output that utilizes a plurality of vocal characteristic sets, where at least a portion of the spoken output corresponds to the textual output, where at least part of the spoken output utilizes vocal characteristics of a first vocal characteristic set, where at least part of the spoken output utilizes vocal characteristics of a second vocal characteristic set, and where at least some of the vocal characteristics of the first vocal characteristic set differ from the vocal characteristics of the second vocal characteristic set.

DETAILED DESCRIPTION

Overview

Figure 1:
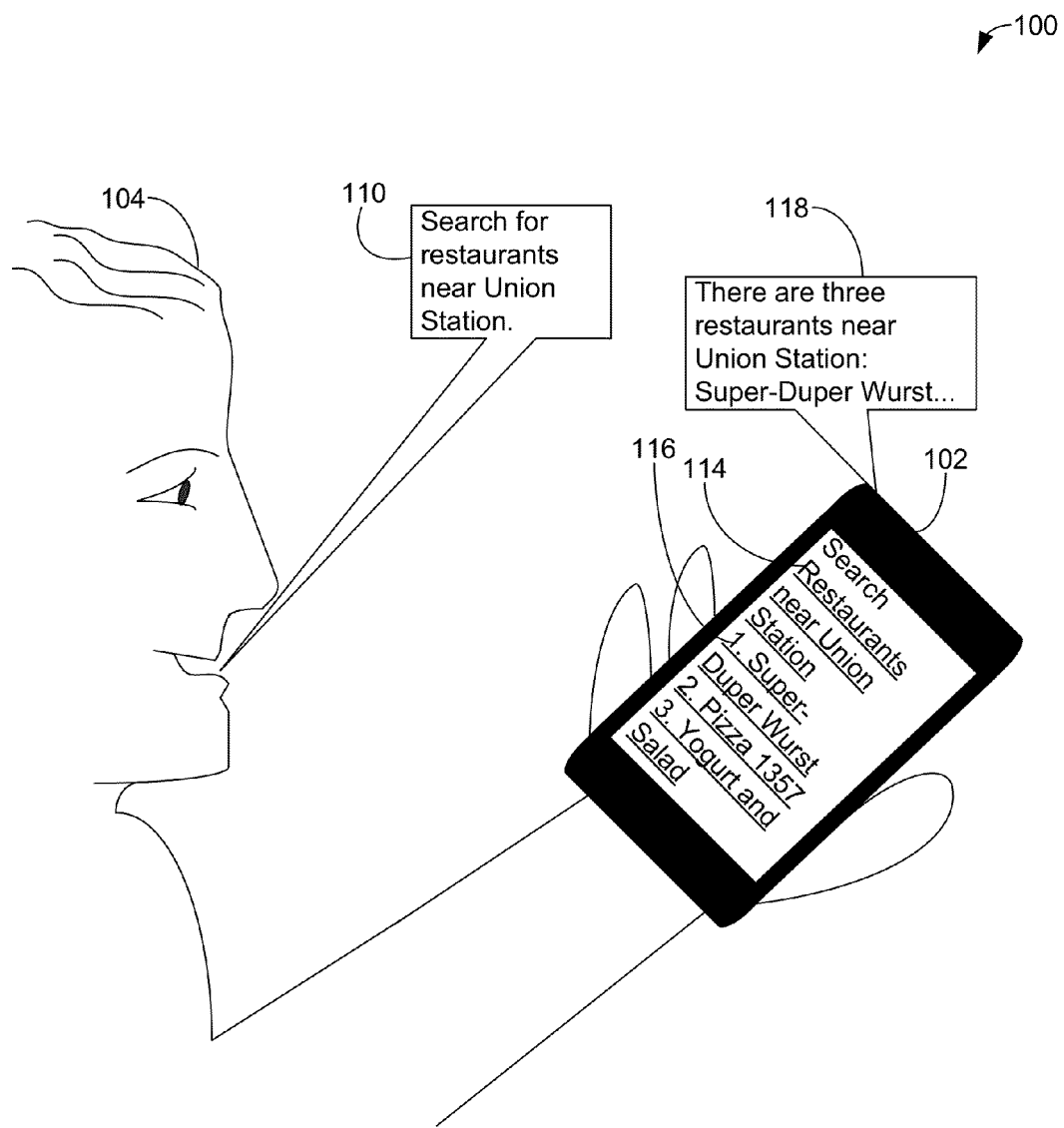
FIG. 1 shows a scenario of prior-art interaction.

Disclosed herein are techniques for generating speech output in which relevant information in an answer or response is emphasized. An example technique is marking portions of speech output, such as search or results terms, that are typically highlighted in textual output. During use, salient terms can be read in a particular emphasized style.

An example of an input command and a corresponding spoken response, with emphasis denoted by asterisks, is as follows:

Input Command: "I'm looking for places to eat near Victoria"

Spoken Response: "Here are some *places to eat near London Victoria*"

The spoken response of "Here are some places to eat near London Victoria" can be considered to have two portions. A "standard portion" of the spoken response can have little or no variation based on either the input command (e.g., I'm looking for places to eat near Victoria) or command output. In contrast, a "salient portion" of the generated response can vary based on the input command and/or command output. In this example, the generated response has one standard portion "Here are some" and one salient portion "places to eat near London Victoria".

In some embodiments, emphasis can be added to salient portions and not added to standard portions. For example, spoken output of a navigation system could commonly be a reading of textual results such as "Make a <type of turn> turn in <number of distance units>", such as "Make a left turn in 100 feet" or "Make a U turn in 300 meters." The example textual result has two standard portions—"Make a" and "turn in"—separated by two salient portions <type of turn> and <number of distance units>. If the salient portions are emphasized and the standard portions are not, the first example output could be read as "Make a *left turn* in *100 feet*", where asterisks denote emphasis. In some examples, each salient portion can have its own level or type of emphasis; e.g., "Make a *left turn* in 100 feet", where "*" and "**" to show two separate levels of emphasis. Other examples are possible as well.

In other embodiments, different voices and/or vocal characteristics can be used for different response portions—e.g., standard portions can be read using one or more "standard voices" and salient portions can be read using one or more "salient voices", where the standard and salient voices differ. For example, male voices that speak faster than a normal syllable speed and at a low pitch have been found to produce less negative cognitive responses and more favorable attitudes. However, male voices that use normal syllable speeds, in comparison to faster syllable speeds, both draw more attention and lead to better retention of the information conveyed. Therefore, if a portion of speech is meant to be persuasive, a low, fast male voice can be used, while a slower voice can be used to increase attention and information retention.

By presenting different portions of synthetic speech with different voices and/or vocal characteristics, the different portions of synthetic spoken speech can be quickly identified. Depending on choices of vocal characteristics, different portions of text can be read by a synthetic voice with different emphasis, read with synthetic voices/vocal characteristics that may increase attentiveness, and/or read with synthetic voices/vocal characteristics that may increase persuasiveness. Using these techniques for varying voices, synthetic speech can be generated that is better understood, identified, and/or is more persuasive than flat speech.

Example Operations

Figure 2:
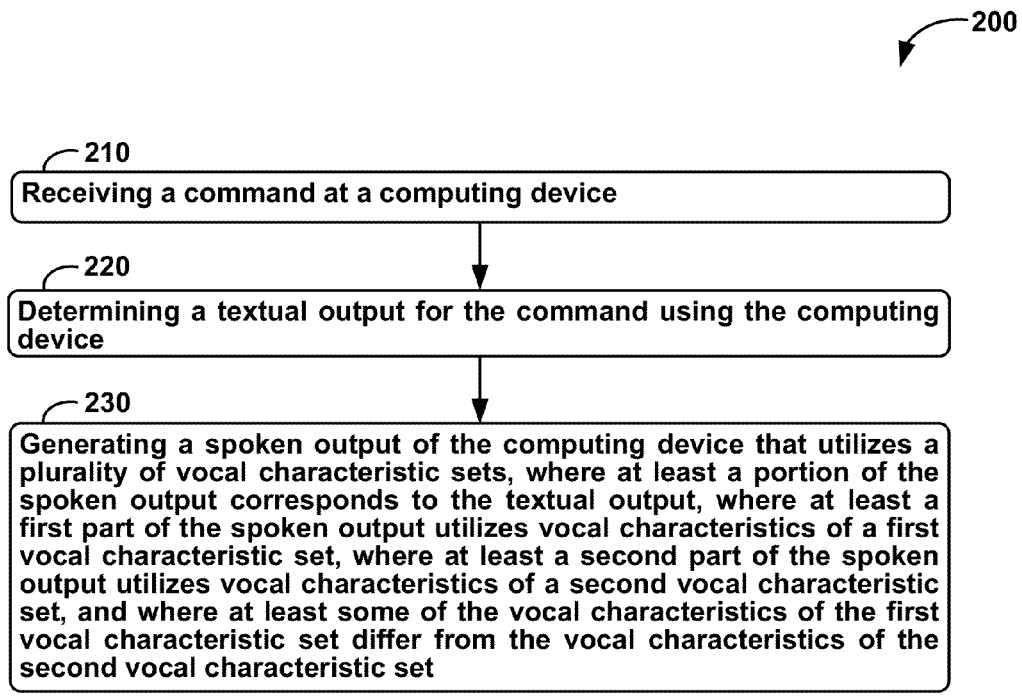
FIG. 2 is a flow chart of a method, in accordance with an example embodiment.

Returning to the figures, FIG. 2 is a flow chart of method 200, in accordance with an example embodiment. Method 200 begins at block 210, where a computing device can receive a command. In some embodiments, the command can include a search query.

At block 220, the computing device can determine a textual output for the command.

At block 230, the computing device can generate a spoken output utilizing a plurality of vocal characteristic sets. At least a portion of the spoken output can correspond to the textual output. At least a first part of the spoken output can utilize vocal characteristics of a first vocal characteristic set. At least a second part of the spoken output can utilize vocal characteristics of a second vocal characteristic set. At least some of the vocal characteristics of the first vocal characteristic set can differ from the vocal characteristics of the second vocal characteristic set.

In some embodiments, the spoken output can include a salient portion and a standard portion. The salient portion can include a portion of the spoken output corresponding to the textual output. The standard portion can utilize the first vocal characteristic set. The salient portion can utilize at least the second vocal characteristic set. In particular embodiments, the salient portion can utilize at least the second vocal characteristic set and a third vocal characteristic set. The second vocal characteristic set can differ from the third vocal characteristic set. In more particular embodiments, the textual output can include a primary output and secondary output. The salient portion can utilize the second vocal characteristic set for the primary output and can utilize the third vocal characteristic set for the secondary output.

In other embodiments, generating the spoken output can include using a machine learning technique to distinguish a salient portion of the textual output from a standard portion of the textual output. Then, the spoken output can be generated by generating a spoken output for the standard portion of the textual output utilizing the first vocal characteristic set, and generating a spoken output for the salient portion of the textual output utilizing the second vocal characteristic set.

In still other embodiments, the spoken output can be generated utilizing a parametric speech model configured to modify a pitch and a duration in mid-syllable for the at least part of the spoken output corresponding to the textual output that utilizes the second vocal characteristic set.

Example Scenarios for Variation of Synthetic Voices

Figure 3:
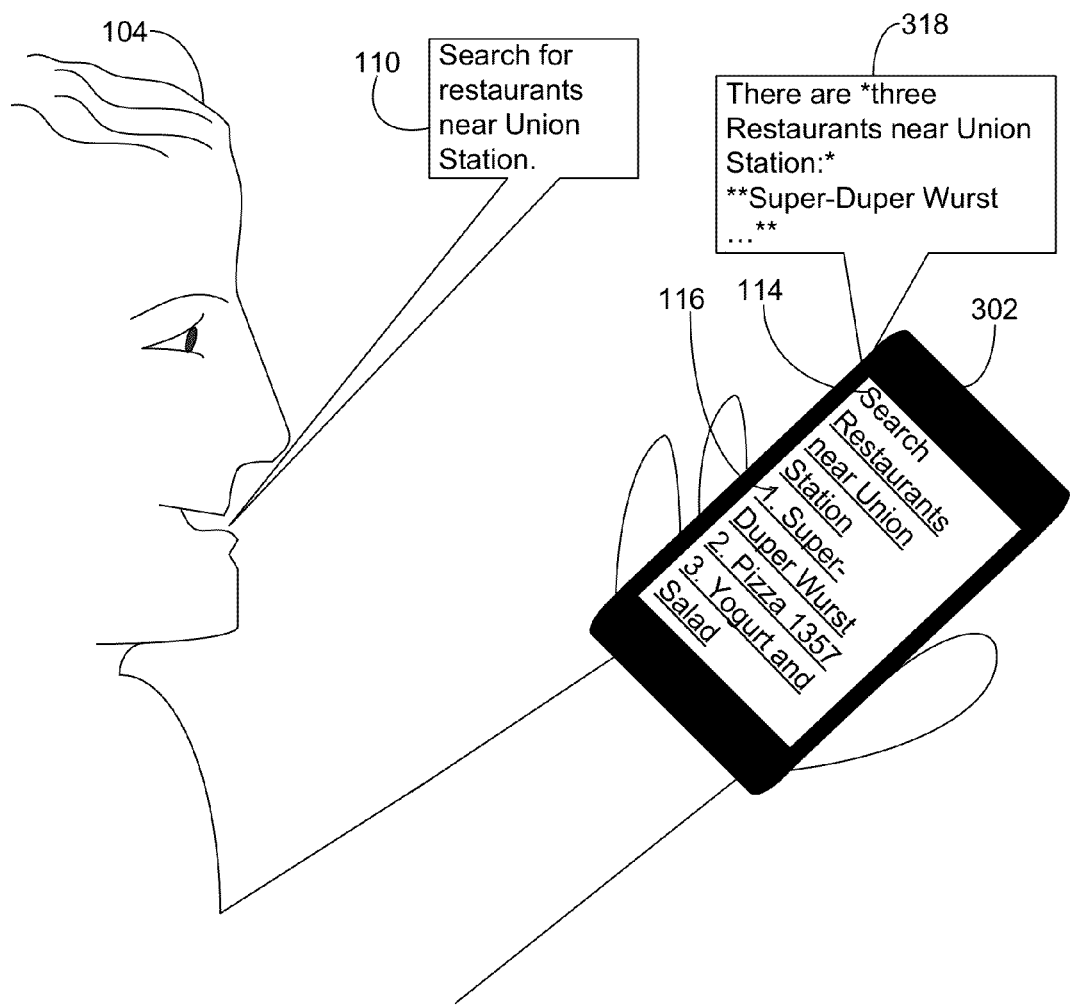
FIG. 3 depicts a scenario utilizing a voice interface for a mobile device, in accordance with an example embodiment.

FIG. 3 depicts a scenario utilizing a voice interface for a mobile device, in accordance with an example embodiment. In scenario 300, speaker 104 provides spoken command 110 to "Search for restaurants near Union Station" to mobile device 302. Mobile device 302 interprets spoken command 110 as a search query and utilizes a search engine with keywords 114 "Restaurants near Union Station." FIG. 3 shows that, in response to the search query, the search engine returns textual results 116 for three restaurants: (1) Super-Duper Wurst, (2) Pizza 1357, and (3) Yogurt and Salad. Mobile device 302 then display textual results 116 and generates speech 318. Speech 318 has three portions: a standard portion "There are", a first salient portion "three Restaurants near Union Station", and second salient portion "Super-Duper Wurst . . . " The first salient portion corresponds to an "echo" of spoken command 110 to verify proper reception of the input command. The second salient portion corresponds to textual results 116, i.e., the output of command 110.

FIG. 2 shows speech 318 as "There are *three Restaurants near Union Station:*Super-Duper Wurst . . . ". Speech 318 shows the standard portion without asterisks to indicate no emphasis is to be placed when generating speech corresponding to the standard portion. Speech 318 shows the first salient portion surrounded by single asterisks, indicating a first level of emphasis is to be used when generating speech corresponding to the first salient portion, and shows the second salient portion is surrounded by double asterisks to indicate a second level of emphasis is to be used when generating speech corresponding to the second salient portion. In some embodiments, each level of emphasis, including a "no emphasis level", differs from each other level of emphasis utilized in generating output speech. Many other emphasis levels are possible as well.

Standard portions, commonly searched, and/or repeated terms can be recorded in a special recording session with the voice talent provided with suitable direction and marked up text. In other embodiments, machine learning techniques can be used to learn standard and salient portions of output and apply emphasis to these portions as needed. For example, the voice models (unit selection or parametric/HMM-TTS) can be trained with the salient/standard information marked on the input stream. During training, these features will be considered when clustering/merging units and at synthesis time the voice model will be able to use them to create a speech sample with the relevant marked-section read in with emphasis.

Standard portions can be de-emphasized, while particularly relevant information of salient portions (phone numbers or numerical results) can be read with the specified style flag (e.g. "The phone number for *Rampaging Books* is *312 555 7425*"). In some embodiments, different styles of emphasis can be placed on inputs than on outputs, e.g., The phone number for *the nearest bookseller*, which is Rampaging Books and can be reached at *312 555 7425*, where *the nearest bookseller* uses one level of emphasis, Rampaging Books uses a second level of emphasis, and *312 555 7425* uses a third level of emphasis.

Other types of command/response system can be used in a similar fashion. For example, in a command-line computing environment, the command "ls" could generate a list of files available in a current directory. Table 1 shows an example command-line session with an input command "ls" being received and a list of 10 files being generated as output:

TABLE 1

| > ls | | | | |
|---|---|---|---|---|
| a.c | a.out | b.c | b.out | c.C |
| c.out | d.C | d.out | foo | mored.out |
| 10 files | | | | |
| > | | | | |

Using the example of Table 1, the system can generate an example spoken response of "The output of the *ls* command is a.c a.out b.c b.out c.C c.out d.C d.out foo mored.out with a total of *10* files.

The example spoken response can use four types of emphasis: no emphasis for the "standard" parts of the spoken output, and three types of emphasis for the "salient" parts of the output, with one type of emphasis for the input command (e.g., *ls*, as shown above), a second type of emphasis for a primary output of the command (e.g., a.c a.out b.c b.out c.C c.out d.C d.out foo mored.out, or the list of files output by the ls command), and a third type of emphasis for a secondary or numerical output of the command (e.g., *10* files in the output list). In some embodiments, the emphasis level can include a speech rate; e.g., the second type of emphasis, used to read a list of files in this example, can be read using speech with a lower speech rate than the other types of emphasis, perhaps to enhance comprehension and/or retention of the file names.

A transform or parameter set for the bold style could be trained or explicitly set as a series of parameters to adapt the prosody of the speech. In some embodiments, a parametric representation of emphatic reading could be approximated using an emphasis level raising pitch and duration mid-syllable. For example, one voice using a number of different emphasis levels can generate the entire speech, with each emphasis level involving one or more prosody changes, such as the afore-mentioned rise in mid-syllabic pitch and duration.

Example User Interfaces

Figure 4A:
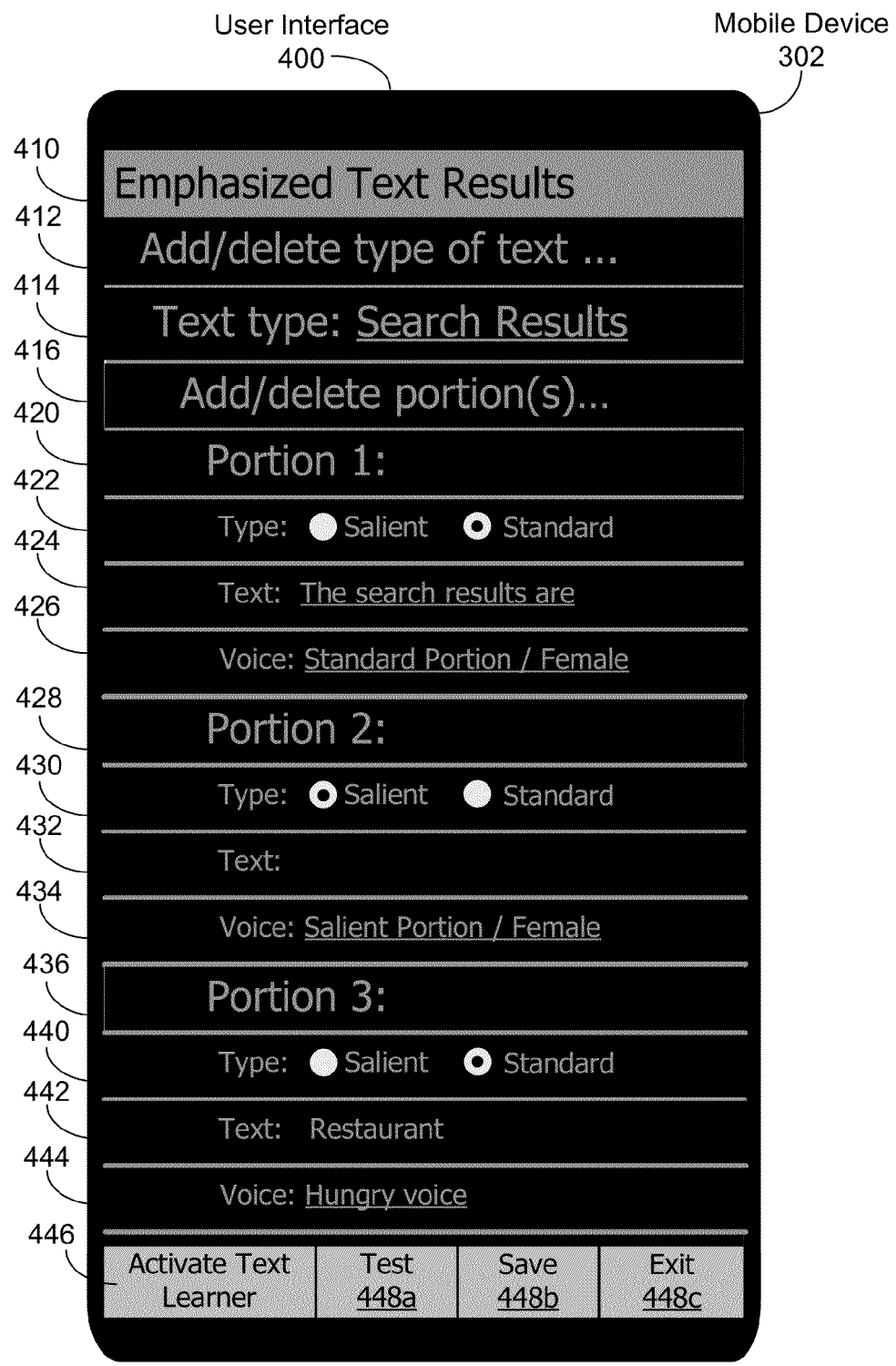
FIG. 4A depicts an example user interface for a mobile device, in accordance with an example embodiment.

FIG. 4A shows example user interface 400 for mobile device 302 that can be used to specify characteristics for reading portions of textual results, in accordance with an example embodiment. User interface 400 can be used to add or delete part or all of a type of textual results, such as but not limited to search results, stock quotes, news articles, blog entries, tweets, mapping/location requests, social network postings, status changes and/or status updates, and/or other types of textual results to a command provided to a computing device.

User interface 400 can be used to review, update, delete, and/or insert types of textual results and portions of textual results. FIG. 4A specifically shows textual-results characteristics 414-444 for textual results of type "Search Results". By selecting add/delete type of text 412, a user interface, not shown in the Figures, for deleting and/or inserting a type of textual results can be provided.

FIG. 4A shows an example type of textual results 414 of "Search Results" that is made up of three portions: Portion 1 420, Portion 2 428, and Portion 3 436. Portions can be added and deleted by selecting add/delete portions 416. By selecting add/delete type portions 416, a user interface, not shown in the Figures, for deleting and/or inserting one or more portions of textual results can be provided.

Regarding Portion 1 420, a portion type user interface 422 can be used to review, update or insert a portion type of either salient or standard. Text 424 related to Portion 1 420 can be provided. When input textual results are provided to mobile device 302, input text from can be compared to text stored for each portion for each type of textual results. When text for a portion of a textual result type matches the input text, the corresponding textual-results characteristics for the matching textual result type can be used in reading the textual results. In the example shown in FIG. 4A, if the input textual results start with "The search results are", then a match of the textual results with text 424 can enable mobile device 302 to read the input textual results using the reader characteristics of the Search Results text type. Other techniques for selecting reader characteristics, such as use of metadata specifying a reader, can be used as well or instead. Voice 426 can be used to specify a reader voice for reading the portion of textual results, such as the "Standard Portion/Female" voice named for Portion 1 as shown in FIG. 4A.

FIG. 4A shows that Portion 2 428 is a salient portion, as specified via portion type 430, does not have any specific matching text 432, and uses a voice named "Salient Portion/Female" as specified as voice 434 to read the portion. Additionally, FIG. 4A shows that Portion 3 436 is a standard portion, as specified via portion type 440, with matching text 442 of "Restaurant", and uses a voice named "Hungry voice" as specified as voice 444 to read the portion.

Button 446 can be used to activate or deactivate a "text learner" that can review textual results and determine textual portions of textual results of commands. By pressing button 446, the on/off status of the text learner can be toggled. For example, FIG. 4A shows the text of "Activate Text Learner" for button 446, implying that the text learner is currently "off", and that pressing button 446 will toggle the on/off status of the text learner to "on." After turning on the text learner, the text of button 446 can change to indicate that pressing button 446 will toggle the text learner status to off; e.g., the changed text of button 446 can be "Deactivate Text Learner."

The text learner can learn that commands have various types, such as search results, stock quotes, news articles, blog entries, tweets, mapping/location requests, social network postings, status changes and/or status updates, among others. Then, for each type of command, the text learner can identify standard portions of textual results for the command. After identifying and classifying standard portions of the textual results, the text learner can classify remaining portion(s) as salient portion(s). Textual-portion characteristics can be specified for each classified portion of the textual results. After the text learner has specified portions and textual-portion characteristics for textual results of a specific type of command, mobile device 302 can use the specified portions and textual-portion characteristics to read the textual results of later commands of the specific type. Other techniques can be used by the text learner to specify portions and textual-portion characteristics of textual results instead or as well.

Button 448a, 448b, and 448c, respectively, can be used to: test read the textual portions specified using user interface 400, save (updated) textual-portion characteristics 414 -444 or exit user interface 400 without saving changes to reader characteristics 414-444.

Figure 4B:
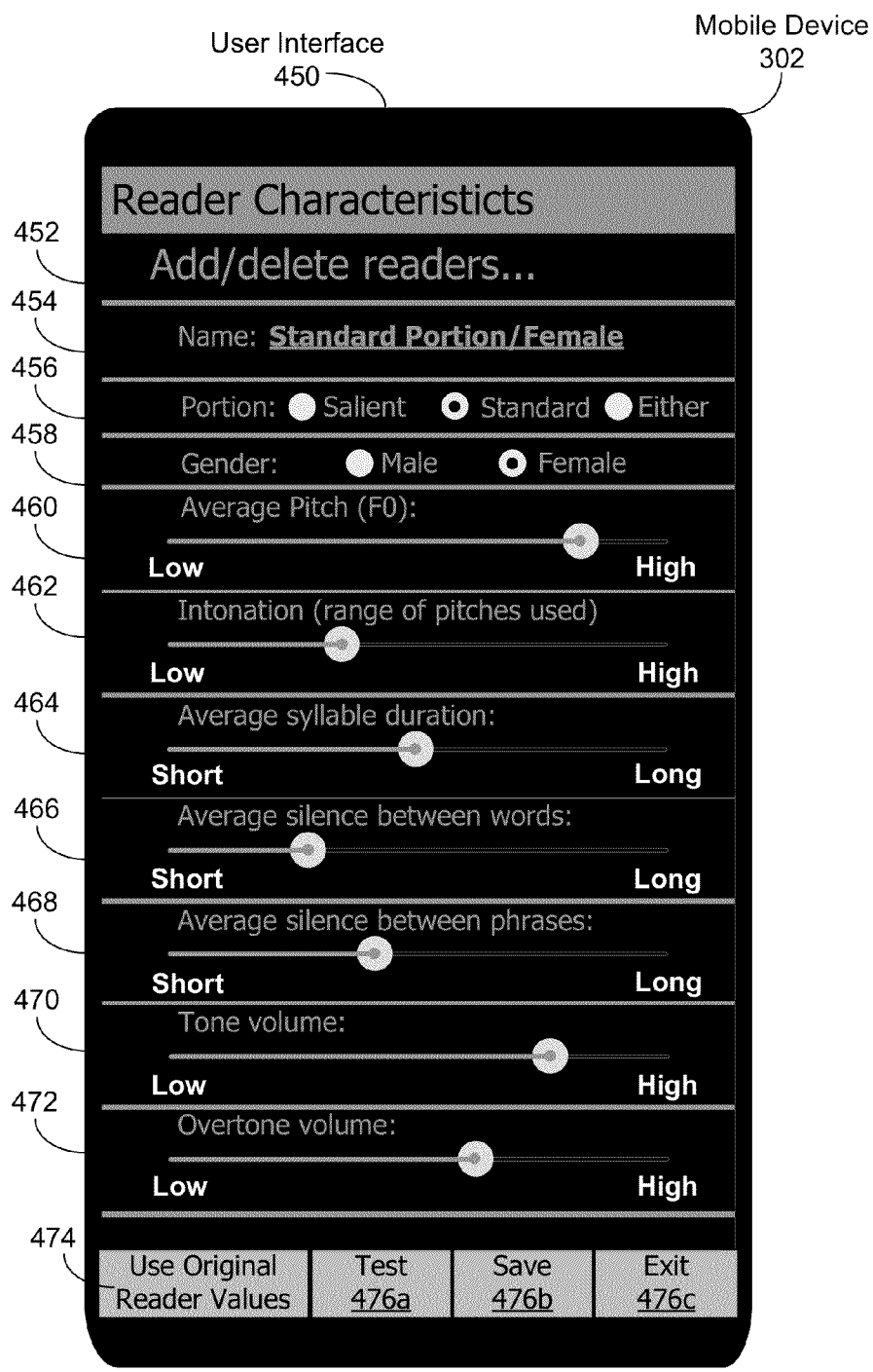
FIG. 4B depicts another example user interface for a mobile device, in accordance with an example embodiment.

FIG. 4B shows example user interface 450 for mobile device 302 that can be used to specify characteristics of a reader of textual results, in accordance with an example embodiment. User interface 450 can be used to add or delete a reader of textual results 452 and/or to review, update, delete, and/or insert reader characteristics 454-472. FIG. 4B specifically shows reader characteristics 454-472 for a reader named "Standard Portion/Female". By selecting add/delete readers 452, a user interface, not shown in the Figures, for deleting and/or inserting a reader can be provided.

Selection of name characteristic 454 permits reviewing, inserting, and/or updating a reader's name. The portion characteristic 456 of user interface 450 permits assigning standard and/or salient portion(s) to the reader. Gender characteristic 458 enables selection of a gender (male or female) to be associated with the reader. Beyond a reader's name, gender, and associated portion(s), reader characteristics can include average pitch 460, intonation 462, average syllable duration 464, average silence between words 466, average silence between phrases 468, tone volume 470, and overtone volume 472. Each of reader characteristics 460, 462, 464, 466, 468, 470, and 472 can be individually modified using a slider bar for the characteristic, as shown in FIG. 4B. In other embodiments, more, fewer, and/or different reader characteristics can be reviewed and/or updated via than the reader characteristics 454-472 shown in FIG. 5B.

Buttons 474, 476a, 476b, and 476c, respectively, can be used to: restore values of reader characteristics 454-472 to previously saved and/or default values, test reader characteristics on an excerpt of text such as "This an example response", save (updated) reader characteristics 454-472 or exit user interface 450 without saving changes to reader characteristics 454-472.

Example Data Network

Figure 5:
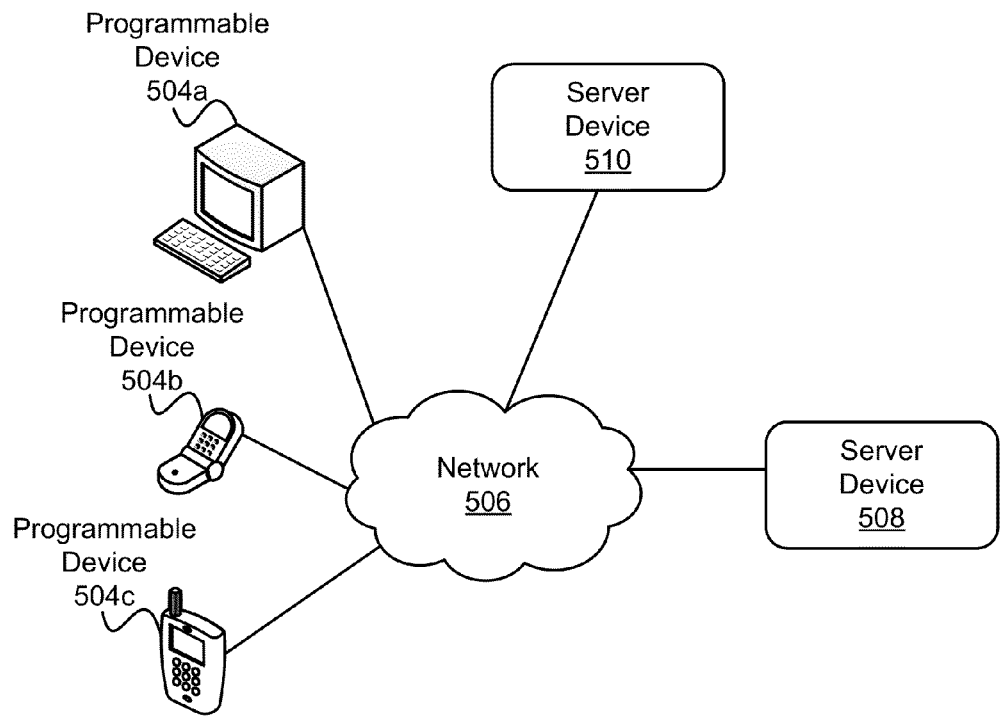
FIG. 5 depicts a distributed computing architecture, in accordance with an example embodiment.

FIG. 5 shows server devices 508, 510 configured to communicate, via network 506, with programmable devices 504a, 504b, and 504c. Network 506 may correspond to a LAN, a wide area network (WAN), a corporate intranet, the public Internet, or any other type of network configured to provide a communications path between networked computing devices. The network 506 may also correspond to a combination of one or more LANs, WANs, corporate intranets, and/or the public Internet.

Although FIG. 5 only shows three programmable devices, distributed application architectures may serve tens, hundreds, or thousands of programmable devices. Moreover, programmable devices 504a, 504b, and 504c (or any additional programmable devices) may be any sort of computing device, such as an ordinary laptop computer, desktop computer, network terminal, wireless communication device (e.g., a cell phone or smart phone), and so on. In some embodiments, programmable devices 504a, 504b, and 504c may be dedicated to the design and use of software applications. In other embodiments, programmable devices 504a, 504b, and 504c may be general purpose computers that are configured to perform a number of tasks and need not be dedicated to software development tools.

Server devices 508, 510 can be configured to perform one or more services, as requested by programmable devices 504a, 504b, and/or 504c. For example, server device 508 and/or 510 can provide content to programmable devices 504a-504c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As another example, server device 508 and/or 510 can provide programmable devices 504a-504c with access to software for database, search, computation, graphical, audio, video, World Wide Web/Internet utilization, and/or other functions. Many other examples of server devices are possible as well.

Computing Device Architecture

Figure 6A:
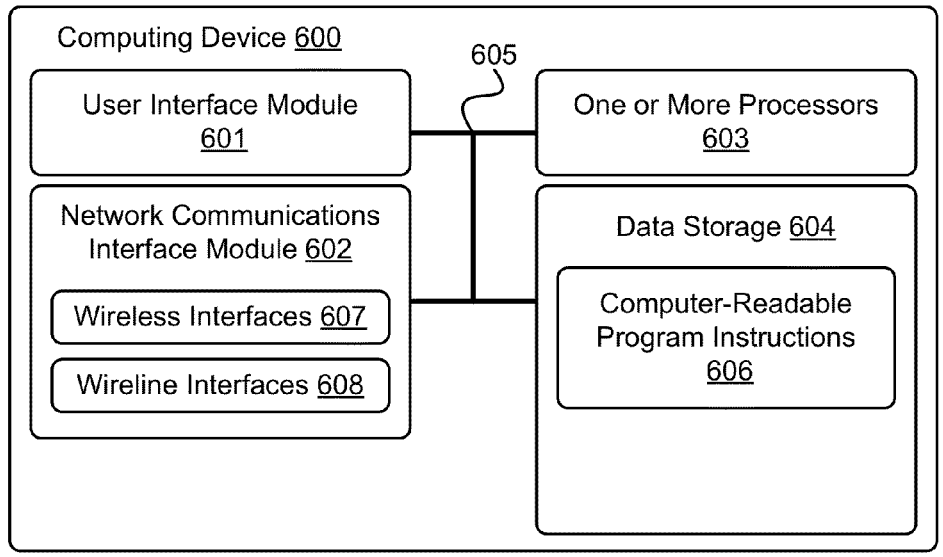
FIG. 6A is a block diagram of a computing device, in accordance with an example embodiment.

FIG. 6A is a block diagram of a computing device (e.g., system) in accordance with an example embodiment. In particular, computing device 600 shown in FIG. 6A can be configured to perform one or more functions or blocks of method 200, mobile device 302, user interfaces 400, 450, server devices 508, 510, network 506, and/or one or more of programmable devices 504a, 504b, and 504c. Computing device 600 may include a user interface module 601, a network-communication interface module 602, one or more processors 603, and data storage 604, all of which may be linked together via a system bus, network, or other connection mechanism 605.

User interface module 601 can be operable to send data to and/or receive data from external user input/output devices. For example, user interface module 601 can be configured to send and/or receive data to and/or from user input devices such as a keyboard, a keypad, a touch screen, a computer mouse, a microphone, a track ball, a joystick, a camera, a voice recognition module, and/or other similar devices. User interface module 601 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 601 can also be configured with one or more sound output devices configured to generate audible output(s), such as a speaker, speaker jack, audio output port, audio output device, earphones, and/or other similar devices.

Network-communications interface module 602 can include one or more wireless interfaces 607 and/or one or more wireline interfaces 608 that are configurable to communicate via a network, such as network 506 shown in FIG. 5. Wireless interfaces 607 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 608 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 602 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 603 can include one or more general purpose processors and/or one or more special purpose processors (e.g., digital signal processors, application specific integrated circuits, etc.). Processors 603 can be configured to execute computer-readable program instructions 606a that are contained in the data storage 604 and/or other instructions as described herein.

Data storage 604 can include one or more computer-readable storage media that can be read and/or accessed by at least one of processors 603. The one or more computer-readable storage media can include volatile and/or non-volatile storage components, such as optical, magnetic, organic or other memory or disc storage, which can be integrated in whole or in part with at least one of processors 603. In some embodiments, data storage 604 can be implemented using a single physical device (e.g., one optical, magnetic, organic or other memory or disc storage unit), while in other embodiments, data storage 604 can be implemented using two or more physical devices.

Data storage 604 can include computer-readable program instructions 606 and perhaps additional data, such as but not limited to data used by one or more processes and/or threads of a software application. In some embodiments, data storage 604 can additionally include storage required to perform at least part of the herein-described methods and techniques and/or at least part of the functionality of the herein-described devices and networks.

Cloud-Based Servers

Figure 6B:
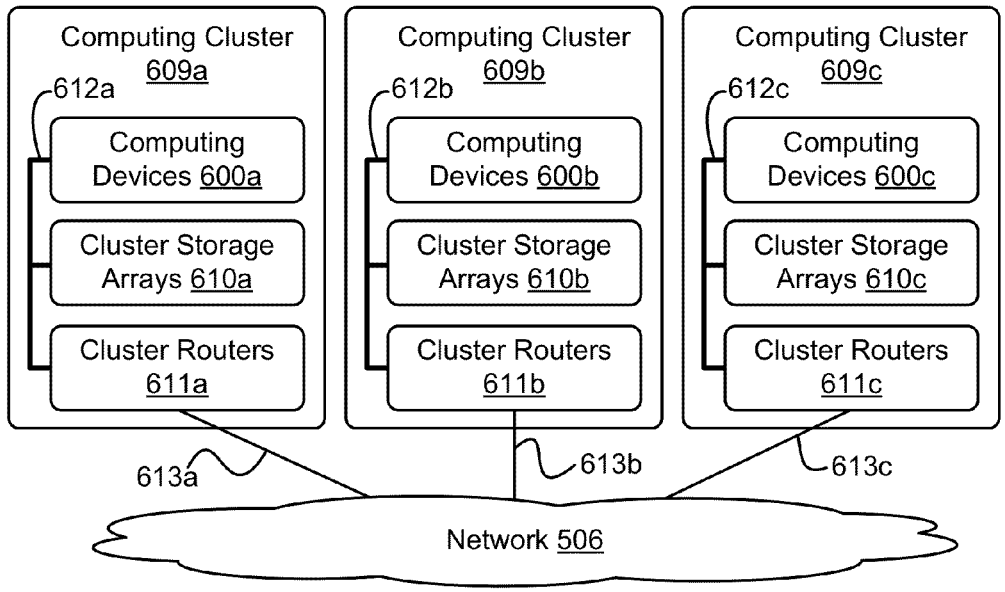
FIG. 6B depicts a cloud-based server system, in accordance with an example embodiment.

FIG. 6B depicts a network 506 of computing clusters 609a, 609b, 609c arranged as a cloud-based server system in accordance with an example embodiment. Server devices 508 and/or 510 can be cloud-based devices that store program logic and/or data of cloud-based applications and/or services. In some embodiments, server devices 508 and/or 510 can be a single computing device residing in a single computing center. In other embodiments, server device 508 and/or 510 can include multiple computing devices in a single computing center, or even multiple computing devices located in multiple computing centers located in diverse geographic locations. For example, FIG. 5 depicts each of server devices 508 and 510 residing in different physical locations.

In some embodiments, data and services at server devices 508 and/or 510 can be encoded as computer readable information stored in non-transitory, tangible computer readable media (or computer readable storage media) and accessible by programmable devices 504a, 504b, and 504c, and/or other computing devices. In some embodiments, data at server device 508 and/or 510 can be stored on a single disk drive or other tangible storage media, or can be implemented on multiple disk drives or other tangible storage media located at one or more diverse geographic locations.

FIG. 6B depicts a cloud-based server system in accordance with an example embodiment. In FIG. 6B, the functions of server device 508 and/or 510 can be distributed among three computing clusters 609a, 609b, and 608c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of the computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of server 508. In one embodiment, the various functionalities of server 508 can be distributed among one or more of computing devices 600a, 600b, and 600c. Computing devices 600b and 600c in computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with server devices 508 and/or 510 can be distributed across computing devices 600a, 600b, and 600c based at least in part on the processing requirements of server devices 508 and/or 510, the processing capabilities of computing devices 600a, 600b, and 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 610a, 610b, and 610c of the computing clusters 609a, 609b, and 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 508 and/or 510 can be distributed across computing devices 600a, 600b, and 600c of computing clusters 609a, 609b, and 609c, various active portions and/or backup portions of these components can be distributed across cluster storage arrays 610a, 610b, and 610c. For example, some cluster storage arrays can be configured to store the data of server device 508, while other cluster storage arrays can store data of server device 610. Additionally, some cluster storage arrays can be configured to store backup versions of data stored in other cluster storage arrays.

The cluster routers 611a, 611b, and 611c in computing clusters 609a, 609b, and 609c can include networking equipment configured to provide internal and external communications for the computing clusters. For example, the cluster routers 611a in computing cluster 609a can include one or more internet switching and routing devices configured to provide (i) local area network communications between the computing devices 600a and the cluster storage arrays 601a via the local cluster network 612a, and (ii) wide area network communications between the computing cluster 609a and the computing clusters 609b and 609c via the wide area network connection 613a to network 506. Cluster routers 611b and 611c can include network equipment similar to the cluster routers 611a, and cluster routers 611b and 611c can perform similar networking functions for computing clusters 609b and 609b that cluster routers 611a perform for computing cluster 609a.

In some embodiments, the configuration of the cluster routers 611a, 611b, and 611c can be based at least in part on the data communication requirements of the computing devices and cluster storage arrays, the data communications capabilities of the network equipment in the cluster routers 611a, 611b, and 611c, the latency and throughput of local networks 612a, 612b, 612c, the latency, throughput, and cost of wide area network links 613a, 613b, and 613c, and/or other factors that can contribute to the cost, speed, fault-tolerance, resiliency, efficiency and/or other design goals of the moderation system architecture.

CONCLUSION

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving a command at a computing device;
   determining a textual response to the command using the computing device;
   providing a graphical user interface of the computing device for specifying spoken output;
   specifying one or more vocal characteristics of at least a first voice and a second voice using the graphical user interface, wherein a first vocal characteristic set is associated with the first voice, and a second vocal characteristic set is associated with the second voice, and wherein the first vocal characteristic set differs from the second vocal characteristic set;
   generating a specification for spoken output specified using the graphical user interface, wherein the specification comprises a first selection to use the first voice in generating a first part of spoken output related to a first portion of the textual response to the command and a second selection to use the second voice in generating a second part of spoken output related to a second portion of the textual response to the command, and wherein the first part of spoken output differs from the second part of spoken output; and
   generating a spoken output of the computing device using the specification for spoken output, wherein the first part of the spoken output utilizes vocal characteristics of the first voice, and wherein the second part of the spoken output utilizes vocal characteristics of the second voice.

2. The method of claim 1, wherein the spoken output comprises a salient portion and a standard portion, wherein the salient portion comprises a portion of the spoken output corresponding to the textual response, wherein the standard portion utilizes the first voice, and wherein the salient portion utilizes at least the second voice.

3. The method of claim 2, wherein the salient portion utilizes at least the second voice and a third voice, and wherein the second voice differs from the third voice.

4. The method of claim 3, wherein the textual response comprises a primary output and secondary output, wherein the salient portion utilizes the second voice for the primary output, and wherein the salient portion utilizes the third voice for the secondary output.

5. The method of claim 1, wherein generating the spoken output comprises:

using a machine learning technique to distinguish a salient portion of the textual response from a standard portion of the textual response; and generating the spoken output by:
generating a spoken output for the standard portion of the textual response utilizing the first voice, and
generating a spoken output for the salient portion of the textual response utilizing the second voice.

6. The method of claim 1, wherein the command comprises a search query.

7. The method of claim 1, wherein the spoken output is generated utilizing a parametric speech model configured to modify a pitch and a duration in mid-syllable for at least a part of the spoken output.

8. A computing device, comprising:
a sound output device;
a processor; and
a computer-readable storage medium having stored thereon program instructions that, upon execution by the processor, cause the computing device to perform operations comprising:
receiving a command,
determining a textual response to the command,
providing a graphical user interface of the computing device for specifying spoken output,
specifying one or more vocal characteristics of at least a first voice and a second voice using the graphical user interface, wherein a first vocal characteristic set is associated with the first voice, and a second vocal characteristic set is associated with the second voice, and wherein the first vocal characteristic set differs from the second vocal characteristic set,
generating a specification for spoken output specified using the graphical user interface, wherein the specification comprises a first selection to use the first voice in generating a first part of spoken output related to a first portion of the textual response to the command and the second selection to use a second voice in generating a second part of spoken output related to a first portion of the textual response to the command, and wherein the first part of spoken output differs from the second part of spoken output, and
generating a spoken output using the specification for spoken output, wherein the first part of the spoken output utilizes vocal characteristics of the first voice, and wherein the second part of the spoken output utilizes vocal characteristics of the second voice.

9. The computing device of claim 8, wherein the spoken output comprises a salient portion and a standard portion, wherein the salient portion comprises a portion of the spoken output corresponding to the textual response, wherein the standard portion utilizes the first voice, and wherein the salient portion utilizes at least the second voice.

10. The computing device of claim 9, wherein the salient portion utilizes at least the second voice and a third voice, and wherein the second voice differs from the third voice.

11. The computing device of claim 10, wherein the textual response comprises a primary output and secondary output, wherein the salient portion utilizes the second voice for the primary output, and wherein the salient portion utilizes the third voice for the secondary output.

12. The computing device of claim 8, wherein generating the spoken output comprises:
using a machine learning technique to distinguish a salient portion of the textual response from a standard portion of the textual response; and
generating the spoken output by:
generating a spoken output for the standard portion of the textual response utilizing the first voice, and
generating a spoken output for the salient portion of the textual response utilizing the second voice.

13. The computing device of claim 8, wherein the command comprises a search query.

14. The computing device of claim 8, wherein the spoken output is generated utilizing a parametric speech model configured to modify a pitch and a duration in mid-syllable for at least a part of the spoken output.

15. An article of manufacture including a non-transitory computer-readable storage medium having stored thereon program instructions that, upon execution by a computing device, cause the computing device to perform operations comprising:
receiving a command;
determining a textual response to the command;
providing a graphical user interface of the computing device for specifying spoken output;
specifying one or more vocal characteristics of at least a first voice and a second voice using the graphical user interface, wherein a first vocal characteristic set is associated with the first voice, and a second vocal characteristic set is associated with the second voice, and wherein the first vocal characteristic set differs from the second vocal characteristic set;
generating a specification for spoken output specified using the graphical user interface, wherein the specification comprises a first selection to use the first voice in generating a first part of spoken output related to a first portion of the textual response to the command and a second selection to use the second voice in generating a second part of spoken output related to a second portion of the textual response to the command, and wherein the first part of spoken output differs from the second part of spoken output; and
generating a spoken output using the specification for spoken output, wherein the first part of the spoken output utilizes vocal characteristics of the first voice and wherein the second part of the spoken output utilizes vocal characteristics of the second voice.

16. The article of manufacture of claim 15, wherein the spoken output comprises a salient portion and a standard portion, wherein the salient portion comprises a portion of the spoken output corresponding to the textual response, wherein the standard portion utilizes the first voice, and wherein the salient portion utilizes at least the second voice.

17. The article of manufacture of claim 16, wherein the salient portion utilizes at least the second voice and a third voice, and wherein the second voice differs from the third voice.

18. The article of manufacture of claim 15, wherein generating the spoken output comprises:
using a machine learning technique to distinguish a salient portion of the textual response from a standard portion of the textual response; and
generating the spoken output by:
generating a spoken output for the standard portion of the textual response utilizing the first voice, and
generating a spoken output for the salient portion of the textual response utilizing the second voice.

19. The article of manufacture of claim 15, wherein the command comprises a search query.

20. The article of manufacture of claim 15, wherein the spoken output is generated utilizing a parametric speech model configured to modify a pitch and a duration in mid-syllable for at least a part of the spoken output.

\* \* \* \* \*